(12) United States Patent
Williams et al.

(10) Patent No.: US 10,831,607 B2
(45) Date of Patent: Nov. 10, 2020

(54) DYNAMIC TRANSACTION THROTTLING IN A DATA PROCESSING SYSTEM SUPPORTING TRANSACTIONAL MEMORY

(71) Applicant: INTERNATIONAL BUSINESS MACHINES CORPORATION, Armonk, NY (US)

(72) Inventors: Derek E. Williams, Round Rock, TX (US); Guy L. Guthrie, Austin, TX (US); Hugh Shen, Round Rock, TX (US); Sanjeev Ghai, Round Rock, TX (US); Hung Doan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 16/049,721

(22) Filed: Jul. 30, 2018

(65) Prior Publication Data

US 2020/0034236 A1 Jan. 30, 2020

(51) Int. Cl.
| | |
|---|---|
| *G06F 11/00* | (2006.01) |
| *G06F 11/14* | (2006.01) |
| *G06F 12/0802* | (2016.01) |
| *G06F 9/30* | (2018.01) |
| *G06F 30/30* | (2020.01) |

(52) U.S. Cl.
CPC ........ *G06F 11/142* (2013.01); *G06F 9/30043* (2013.01); *G06F 12/0802* (2013.01); *G06F 30/30* (2020.01); *G06F 2212/1041* (2013.01); *G06F 2212/60* (2013.01)

(58) Field of Classification Search
CPC ............. G06F 11/1402; G06F 11/1446; G06F 11/1448; G06F 11/1458; G06F 11/142; G06F 11/1423; G06F 11/1425; G06F 11/1428; G06F 11/20; G06F 11/2005; G06F 11/2007; H04L 41/0659
USPC ......................................................... 714/15
See application file for complete search history.

(56) References Cited

U.S. PATENT DOCUMENTS

| | | |
|---|---|---|
| 7,159,082 B1 | 1/2007 | Wade |
| 7,966,459 B2 | 6/2011 | Nussbaum et al. |
| 8,402,464 B2 | 3/2013 | Dice et al. |
| 8,539,486 B2 | 9/2013 | Cain, III et al. |
| 8,689,219 B2 | 4/2014 | Antani et al. |
| 8,707,311 B2 | 4/2014 | Antani et al. |
| 8,719,828 B2 | 5/2014 | Lewis et al. |
| 8,914,620 B2 | 12/2014 | Dice |
| 9,424,013 B2 | 8/2016 | Dice |
| 9,658,961 B2 | 5/2017 | Gschwind et al. |

(Continued)

*Primary Examiner* — Sarai E Butler
(74) *Attorney, Agent, or Firm* — Brian F. Russell; David Quinn

(57) ABSTRACT

In a processing unit, a processor core executes instructions in a plurality of simultaneous hardware threads, where multiple of the plurality of hardware threads concurrently execute memory transactions. A transactional memory circuit in the processing unit tracks transaction footprints of the memory transactions of the multiple hardware thread. In response to detecting failure of a given memory transaction of one of the plurality of multiple threads due to an overflow condition, the transactional memory circuit transitions to a throttled operating mode and reduces a number of hardware threads permitted to concurrently execute memory transactions.

20 Claims, 9 Drawing Sheets

(56) References Cited

U.S. PATENT DOCUMENTS

| | | | |
|---|---|---|---|
| 2008/0288730 A1* | 11/2008 | Heller, Jr. | G06F 12/0817 |
| | | | 711/159 |
| 2010/0082952 A1* | 4/2010 | Sunayama | G06F 9/3851 |
| | | | 712/234 |
| 2010/0138841 A1* | 6/2010 | Dice | G06F 9/466 |
| | | | 718/107 |
| 2011/0138134 A1 | 6/2011 | Moir et al. | |
| 2012/0254888 A1* | 10/2012 | Kalogeropulos | G06F 8/452 |
| | | | 718/107 |
| 2014/0101479 A1* | 4/2014 | Galbraith | G06F 11/1076 |
| | | | 714/6.2 |
| 2015/0277922 A1* | 10/2015 | Bartik | G06F 9/3851 |
| | | | 712/215 |
| 2015/0378915 A1 | 12/2015 | Gschwind | |
| 2016/0019107 A1* | 1/2016 | North | G06F 9/45558 |
| | | | 714/19 |
| 2016/0239431 A1* | 8/2016 | Li | G06F 12/1045 |
| 2016/0378490 A1* | 12/2016 | Lemay | G06F 11/0745 |
| | | | 714/25 |
| 2017/0075720 A1* | 3/2017 | Kogan | H04Q 3/54541 |
| 2017/0293488 A1* | 10/2017 | Feiste | G06F 9/3851 |
| 2018/0276046 A1* | 9/2018 | Joao | G06F 12/084 |

\* cited by examiner

DYNAMIC TRANSACTION THROTTLING IN A DATA PROCESSING SYSTEM SUPPORTING TRANSACTIONAL MEMORY

BACKGROUND OF THE INVENTION

The present invention relates generally to data processing and, in particular, to storage accesses to the distributed shared memory system of a data processing system.

A conventional multiprocessor (MP) computer system, such as a server computer system, includes multiple processing units all coupled to a system interconnect, which typically comprises one or more address, data and control buses. Coupled to the system interconnect is a system memory, which represents the lowest level of volatile memory in the multiprocessor computer system and which generally is accessible for read and write access by all processing units. In order to reduce access latency to instructions and data residing in the system memory, each processing unit is typically further supported by a respective multi-level cache hierarchy, the lower level(s) of which may be shared by one or more processor cores.

Cache memories are commonly utilized to temporarily buffer memory blocks that might be accessed by a processor in order to speed up processing by reducing access latency introduced by having to load needed data and instructions from system memory. In some MP systems, the cache hierarchy includes at least two levels. The level one (L1) or upper-level cache is usually a private cache associated with a particular processor core and cannot be accessed by other cores in an MP system. Typically, in response to a memory access instruction such as a load or store instruction, the processor core first accesses the directory of the upper-level cache. If the requested memory block is not found in the upper-level cache, the processor core then accesses lower level caches (e.g., level two (L2) or level three (L3) caches) or system memory for the requested memory block. The lowest level cache (e.g., L3 cache) is often shared among several processor cores.

In such systems, multiprocessor software concurrently accesses shared data structures from multiple software threads. When concurrently accessing shared data it is typically necessary to prevent so-called "unconstrained races" or "conflicts". A conflict occurs between two memory accesses when they are to the same memory location and at least one of them is a write and there is no means to ensure the ordering in which those accesses occur.

Multiprocessor software typically utilizes lock variables to coordinate the concurrent reading and modifying of locations in memory in an orderly conflict-free fashion. A lock variable is a location in memory that is read and then set to a certain value, possibly based on the value read, in an atomic fashion. The read-modify-write operation on a lock variable is often accomplished utilizing an atomic-read-modify-write (ARMW) instruction or by a sequence of instructions that provide the same effect as a single instruction that atomically reads and modifies the lock variable.

In this manner, a software thread reading an initial "unlocked" value via an ARMW instruction is said to have "acquired" the lock and will, until it releases the lock, be the only software thread that holds the lock. The thread holding the lock may safely update the shared memory locations protected by the lock without conflict with other threads because the other threads cannot obtain the lock until the current thread releases the lock. When the shared locations have been read and/or modified appropriately, the thread holding the lock releases the lock (e.g., by writing the lock variable to the "unlocked" value) to allow other threads to access the shared locations in storage.

While locking coordinates competing threads' accesses to shared data, locking suffers from a number of well known shortcomings. These include, among others, (1) the possibility of deadlock when a given thread holds more than one lock and prevents the forward progress of other threads and (2) the performance cost of lock acquisition when the lock may not have been strictly necessary because no conflicting accesses would have occurred to the shared data.

To overcome these limitations, the notion of transactional memory can be employed. In transactional memory, a set of load and/or store instructions are treated as a "transaction." A transaction succeeds when the constituent load and store operations can occur atomically without a conflict with another thread. The transaction fails in the presence of a conflict with another thread and can then be re-attempted. If a transaction continues to fail, software may fall back to using locking to ensure the orderly access of shared data.

To support transactional memory, the underlying hardware tracks the storage locations involved in the transaction—the transaction footprint—for conflicts as the transaction executes. If a conflict occurs in the transaction footprint, the transaction is aborted and possibly restarted. Use of transactional memory reduces the possibility of deadlock due to a thread holding multiple locks because, in the typical case, no locks are held (the transaction simply attempts to make one or more storage accesses and restarts if a conflict occurs). Further, the processing overhead of acquiring a lock is generally avoided.

BRIEF SUMMARY

In at least one embodiment, a processor core of a processing unit executes instructions in a plurality of simultaneous hardware threads, where multiple of the plurality of hardware threads concurrently execute memory transactions. A transactional memory circuit in the processing unit tracks transaction footprints of the memory transactions of the multiple hardware thread. In response to detecting failure of a given memory transaction of one of the plurality of multiple threads due to an overflow condition, the transactional memory circuit transitions to a throttled operating mode and reduces a number of hardware threads permitted to concurrently execute memory transactions.

DETAILED DESCRIPTION

Figure 1:
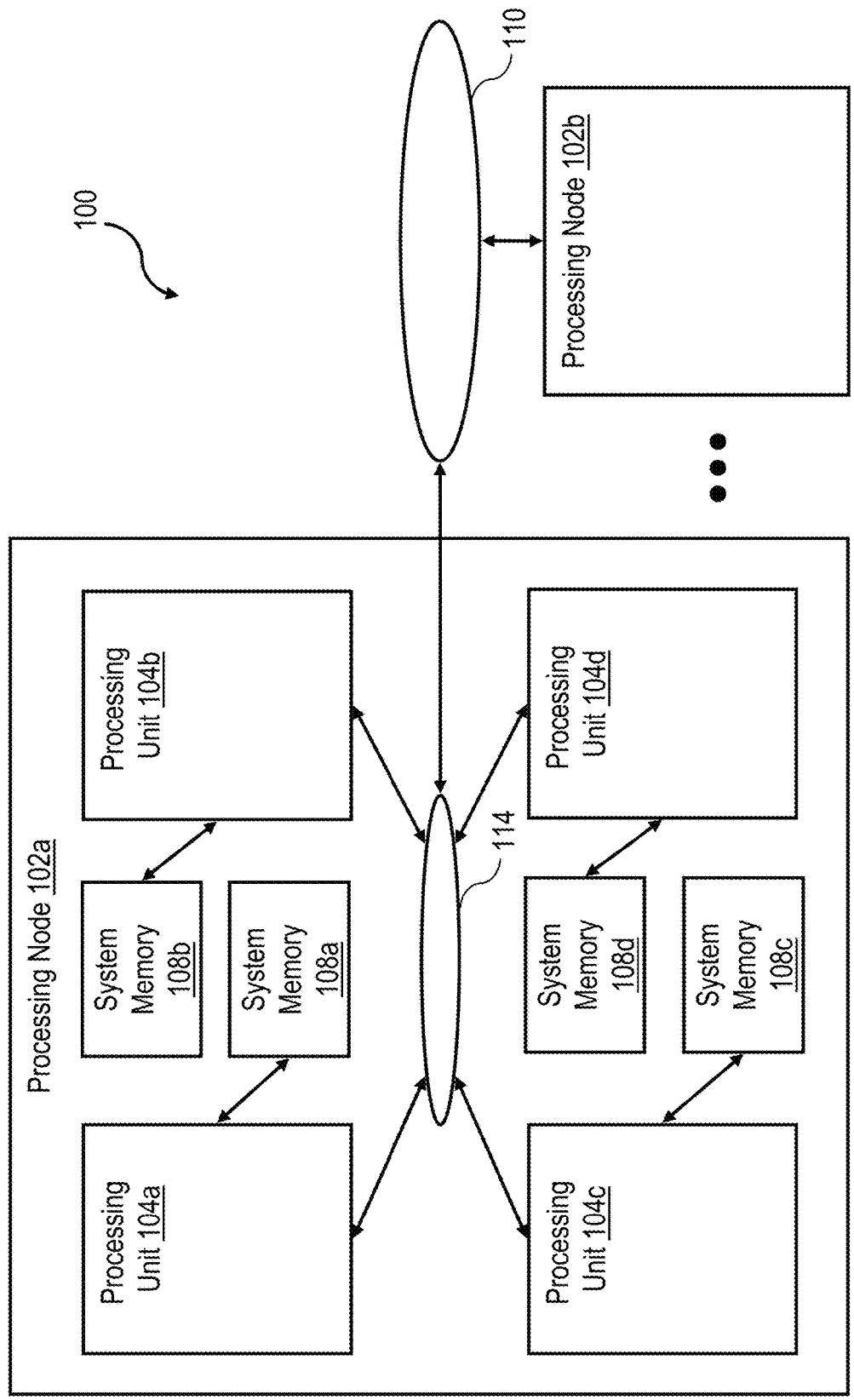
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high level block diagram depicting an exemplary data processing system 100 in accordance with one embodiment. In the depicted embodiment, data processing system 100 is a cache coherent symmetric multiprocessor (SMP) data processing system including multiple processing nodes 102a, 102b for processing data and instructions. Processing nodes 102 are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d, each preferably realized as a respective integrated circuit. The processing units 104 within each processing node 102 are coupled for communication to each other and system interconnect 110 by a local interconnect 114, which, like system interconnect 110, may be implemented, for example, with one or more buses and/or switches. System interconnect 110 and local interconnects 114 together form a system fabric.

As described below in greater detail with reference to FIG. 2, processing units 104 each include a memory controller 106 coupled to local interconnect 114 to provide an interface to a respective system memory 108. Data and instructions residing in system memories 108 can generally be accessed, cached and modified by a processor core in any processing unit 104 of any processing node 102 within data processing system 100. System memories 108 thus form the lowest level of volatile storage in the distributed shared memory system of data processing system 100. In alternative embodiments, one or more memory controllers 106 (and system memories 108) can be coupled to system interconnect 110 rather than a local interconnect 114.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to cache coherent data processing systems of diverse architectures and are in no way limited to the generalized data processing system architecture illustrated in FIG. 1.

Multiprocessor data processing system such as data processing system 100 of FIG. 1 implement a memory consistency model that specifies the legal possible executions of a given multiprocessor program with respect to memory accesses (e.g., among other things, the values that may be returned by load instructions, the order of writes to memory, those instruction execution dependencies that affect the ordering of memory accesses, and the final values for memory locations at the conclusion of a multiprocessor program). A memory consistency model is specified by two major characteristics: ordering of memory access operations and atomicity of store operations.

The ordering of memory operations specifies how memory operations may, if at all, be re-ordered relative to the order of their respective load and store instructions in the individual threads of execution in the multiprocessor program. Memory consistency models must define ordering of memory access operations in four general cases: (1) ordering of the memory operations for a load instruction to a following load instruction, (2) ordering of the memory operations for a load instruction to a following store instruction, (3) ordering of the memory operations for a store instruction to a following store instruction, and (4) ordering of the memory operations for a store instruction to a following load instruction. Strong consistency memory models will, in general, preserve all or at least most of these orderings. In particular, many strong consistency memory models enforce the first three orderings, but do not enforce store-to-load ordering. Weak consistency memory models will generally not enforce most or all of these orderings.

Atomicity of store operations refers to whether or not a given thread of execution can read the value of its own store operation before other threads, and furthermore, whether the value written to the distributed shared memory system by the store operation becomes visible to other threads in a logically instantaneous fashion or whether the value can become visible to other threads at different points in time. A memory consistency model is called "multi-copy atomic" if the value written by a store operation of one thread becomes visible to all other threads in a logically instantaneous fashion. In general, strong consistency memory models are multi-copy atomic, and weak consistency memory models do not enforce multi-copy atomicity.

In a given multiprocessor program, program semantics often require that multi-copy atomicity and/or the various orderings between memory access operations are respected. Therefore, in a data processing system 100 having a distributed shared memory system that implements a weak consistency memory model (as will be assumed hereafter), so called "barrier" (e.g., SYNC) instructions are typically provided to allow the programmer to specify what memory access operation orderings and atomicity are to be applied during execution of the multiprocessor program.

Figure 2:
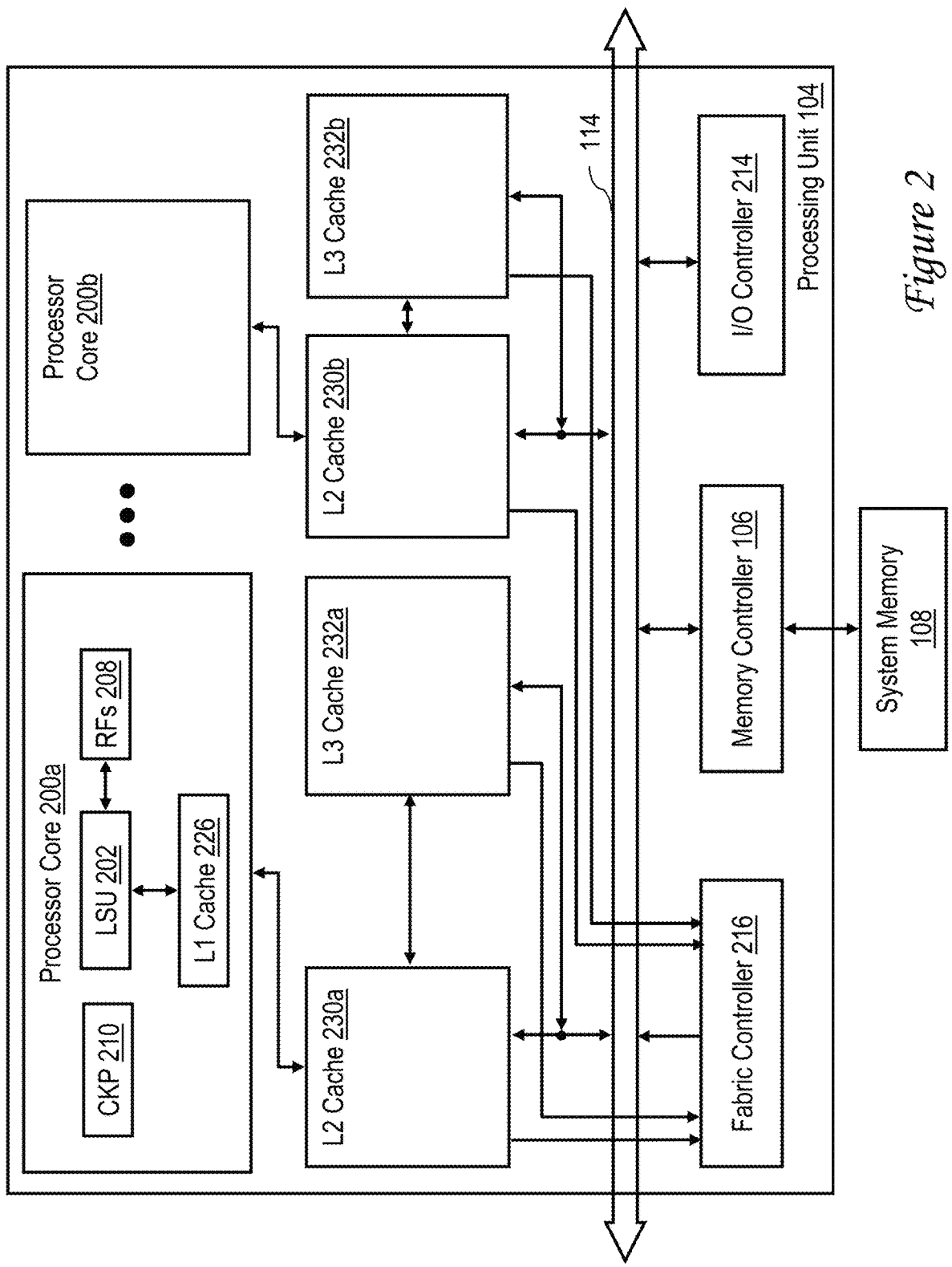
FIG. 2 is a more detailed block diagram of an exemplary processing unit in accordance with one embodiment.

Referring now to FIG. 2, there is depicted a more detailed block diagram of an exemplary processing unit 104 in accordance with one embodiment. In the depicted embodiment, each processing unit 104 is an integrated circuit including one or more processor cores (in this case, at least processor cores 200a, 200b) for processing instructions and data. In some embodiments, each processor core 200 is capable of independently executing multiple simultaneous hardware threads of execution.

As depicted, each processor core 200 includes one or more execution units, such as load-store unit (LSU) 202, for executing instructions. The instructions executed by LSU 202 include memory access instructions that request load or store access to a memory block in the distributed shared memory system or cause the generation of a request for load or store access to a memory block in the distributed shared memory system. Memory blocks obtained from the distributed shared memory system by load accesses are buffered in one or more register files (RFs) 208, and memory blocks updated by store accesses are written to the distributed shared memory system from the one or more register files 208. Each processor core further includes a checkpoint register 210 for storing a copy of the architected register state of processor core 200.

The operation of each processor core 200 is supported by a multi-level volatile memory hierarchy having at its lowest level a shared system memory 108 accessed via an integrated memory controller 106, and at its upper levels, one or more levels of cache memory, which in the illustrative embodiment include a store-through level one (L1) cache 226 within and private to each processor core 200, a respective store-in level two (L2) cache 230a, 230b for each processor core 200a, 200b, and a respective level three (L3) victim cache 232a, 232b for each processor core 200a, 200b populated with cache lines evicted from one or more of L2 caches 230. Each of L2 caches 230 and L3 caches 232 is further coupled to local interconnect 114 and to a fabric controller 216 to facilitate participation of caches 230, 232 in the coherent data communication of data processing system 100.

Although the illustrated cache hierarchies includes only three levels of cache, those skilled in the art will appreciate that alternative embodiments may include additional levels (L4, etc.) of on-chip or off-chip, private or shared, in-line or lookaside cache, which may be fully inclusive, partially inclusive, or non-inclusive of the contents the upper levels of cache.

Each processing unit 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing unit 104 further includes an integrated I/O (input/output) controller 214 supporting the attachment of one or more I/O devices (not depicted).

In operation, when a hardware thread under execution by a processor core 200 includes a memory access (e.g., load or store) instruction requesting a specified memory access operation to be performed, LSU 202 executes the memory access instruction to determine the target address (e.g., an effective address) of the memory access request. After translation of the target address to a real address, L1 cache 226 is accessed utilizing the target address. Assuming the indicated memory access cannot be satisfied solely by reference to L1 cache 226, LSU 202 then transmits the memory access request, which includes at least a transaction type (ttype) (e.g., load or store) and the target real address, to its affiliated L2 cache 230 for servicing. In servicing the memory access request, L2 cache 230 may access its associated L3 cache 232 and/or initiate a transaction including the memory access request on the system fabric.

Figure 3:
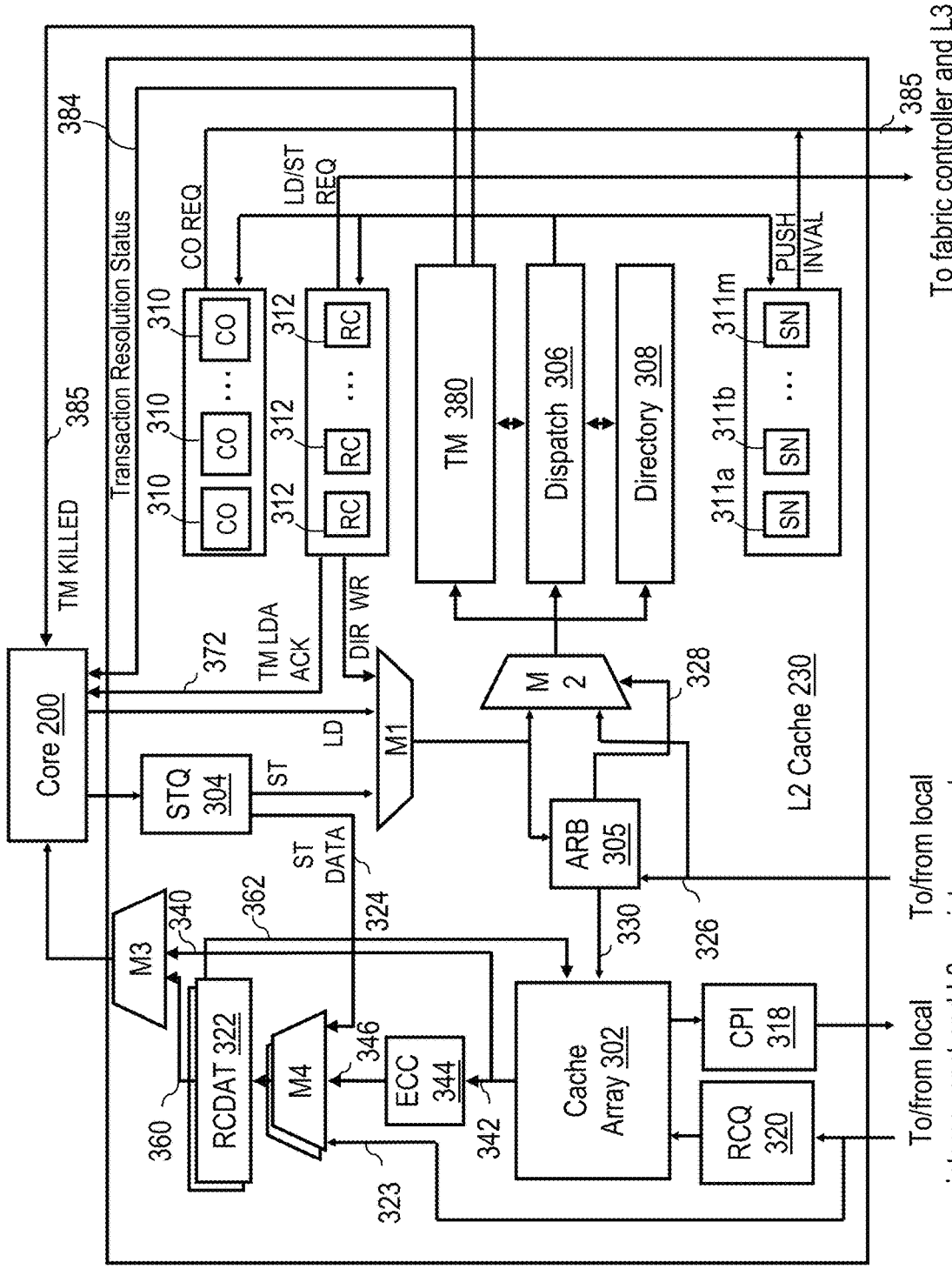
FIG. 3 is a more detailed block diagram of a level two (L2) cache supporting memory transactions in accordance with one embodiment.

With reference now to FIG. 3, there is illustrated a more detailed block diagram of an exemplary embodiment of an L2 cache 230 that supports memory transactions in accordance with one embodiment. As shown in FIG. 3, L2 cache 230 includes a cache array 302 and a L2 directory 308 of the contents of cache array 302. Although not explicitly illustrated, cache array 302 preferably is implemented with a single read port and single write port to reduce the die area required to implement cache array 302.

Assuming cache array 302 and L2 directory 308 are set-associative as is conventional, memory locations in system memories 108 are mapped to particular congruence classes within cache array 302 utilizing predetermined index bits within the system memory (real) addresses. The particular memory blocks stored within the cache lines of cache array 302 are recorded in L2 directory 308, which contains one directory entry for each cache line. While not expressly depicted in FIG. 3, it will be understood by those skilled in the art that each directory entry in L2 directory 308 includes various fields, for example, a tag field that identifies the real address of the memory block held in the corresponding cache line of cache array 302, a state field that indicate the coherency state of the cache line, an LRU (Least Recently Used) field indicating a replacement order for the cache line with respect to other cache lines in the same congruence class, and inclusivity bits indicating whether the memory block is held in the associated L1 cache 226.

L2 cache 230 includes multiple (e.g., 16) Read-Claim (RC) machines 312 for independently and concurrently servicing load (LD) and store (ST) requests received from the affiliated processor core 200. In order to service remote memory access requests originating from processor cores 200 other than the affiliated processor core 200, L2 cache 230 also includes multiple snoop machines 311. Each snoop machine 311 can independently and concurrently handle a remote memory access request "snooped" from local interconnect 114. As will be appreciated, the servicing of memory access requests by RC machines 312 may require the replacement or invalidation of memory blocks within cache array 302. Accordingly, L2 cache 230 also includes CO (castout) machines 310 that manage the removal of memory blocks from cache array 302 and the storage of those memory blocks in system memory 108 (i.e., write-backs) or the affiliated L3 cache 232 (i.e., L3 cast-ins).

L2 cache 230 further includes an arbiter 305 that controls multiplexers M1-M2 to order the processing of local memory access requests and memory transaction requests (e.g., corresponding to the tbegin and tend, instructions described further herein) received from the affiliated processor core 200 and remote memory access requests snooped on local interconnect 114. Such requests, including local load and store and memory transaction requests and remote load and store requests, are forwarded in accordance with the arbitration policy implemented by arbiter 305 to dispatch logic, such as a dispatch pipeline 306, which processes each memory access request with respect to L2 directory 308 and cache array 302 and, if necessary and the required resource is available, dispatches the memory access request to the appropriate state machine for handling.

As described in greater detail below, L2 cache 230 also includes transactional memory (TM) logic 380, which supports execution of memory transactions by the associated processor core 200. TM logic 380 tracks transactional memory access (e.g., load and store) requests within the memory transactions to ensure that they complete in an atomic fashion or fail in the presence of a conflict. TM logic 380 also controls the sequencing of a memory transaction and provides a transaction resolution status 384 and an optional TM killed indication 385 to the associated processor core 200. Transaction resolution status 384 indicates to processor core 200 whether or not a memory transaction successfully committed to the distributed shared memory system at the end of the memory transaction, and if it failed, the reason for the failure. TM killed indication 385 indicates to processor core 200 whether or not a conflict has occurred during the transaction. In response to transactional control logic 382 asserting TM killed indication 385, processor core 200 may, as a performance optimization, optionally abort and restart memory transaction prior to reaching its end.

L2 cache 230 also includes an RC queue 320 and a CPI (castout push intervention) queue 318 that respectively buffer data being inserted into and removed from the cache array 302. RC queue 320 includes a number of buffer entries that each individually correspond to a particular one of RC machines 312 such that each RC machine 312 that is dispatched retrieves data from only the designated buffer entry. Similarly, CPI queue 318 includes a number of buffer entries that each individually correspond to a particular one of the castout machines 310 and snoop machines 311, such that CO machines 310 and snoopers 311 direct transfer of data from cache array 302 (e.g., to another L2 cache 230, to the associated L3 cache 232, or to a system memory 108) via only their respective designated CPI buffer entries.

Each RC machine 312 also has assigned to it a respective one of multiple RC data (RCDAT) buffers 322 for buffering a memory block read from cache array 302 and/or received from local interconnect 114 via reload bus 313. The RCDAT buffer 322 assigned to each RC machine 312 is preferably constructed with connections and functionality corresponding to the memory access requests that may be serviced by the associated RC machine 312. RCDAT buffers 322 have an associated store data multiplexer M4 that selects data bytes from among its inputs for buffering in the RCDAT buffer 322 in response unillustrated select signals generated by arbiter 305.

In operation, a processor core 200 transmits store requests comprising a transaction type (ttype), target real address and store data to a store queue (STQ) 304. From STQ 304, the store data are transmitted to store data multiplexer M4 via data path 324, and the transaction type and target address are passed to multiplexer M1. Multiplexer M1 also receives as inputs processor load requests from processor core 200 and directory write requests from RC machines 312. In response to unillustrated select signals generated by arbiter 305, multiplexer M1 selects one of its input requests to forward to multiplexer M2, which additionally receives as an input a remote memory access request received from local interconnect 114 via remote request path 326. Arbiter 305 schedules local and remote memory access requests for processing and, based upon the scheduling, generates a sequence of select signals 328. In response to select signals 328 generated by arbiter 305, multiplexer M2 selects either the local memory access request received from multiplexer M1 or the remote memory access request snooped from local interconnect 114 as the next memory access request to be processed.

The memory access request selected for processing by arbiter 305 is placed by multiplexer M2 into dispatch pipeline 306. Dispatch pipeline 306 preferably is implemented as a fixed duration pipeline in which each of multiple possible overlapping requests is processed for a predetermined number of clock cycles (e.g., 4 cycles). During the first cycle of processing within dispatch pipeline 306, a directory read is performed utilizing the request address to determine if the request address hits or misses in L2 directory 308, and if the memory address hits, the coherency state of the target memory block. The directory information, which includes a hit/miss indication and the coherency state of the memory block, is returned by L2 directory 308 to dispatch pipeline 306 in a subsequent cycle. As will be appreciated, no action is generally taken within an L2 cache 230 in response to miss on a remote memory access request; such remote memory requests are accordingly discarded from dispatch pipeline 306. However, in the event of a hit or miss on a local memory access request or a hit on a remote memory access request, L2 cache 230 will service the memory access request, which for requests that cannot be serviced entirely within processing unit 104, may entail communication on local interconnect 114 via fabric controller 216.

At a predetermined time during processing of the memory access request within dispatch pipeline 306, arbiter 305 transmits the request address to cache array 302 via address and control path 330 to initiate a cache read of the memory block specified by the request address. The memory block read from cache array 302 is transmitted via data path 342 to Error Correcting Code (ECC) logic 344, which checks the memory block for errors and, if possible, corrects any detected errors. For processor load requests, the memory block is also transmitted to load data multiplexer M3 via data path 340 for forwarding to the affiliated processor core 200.

At the last cycle of the processing of a memory access request within dispatch pipeline 306, dispatch pipeline 306 makes a dispatch determination based upon a number of criteria, including (1) the presence of an address collision between the request address and a previous request address currently being processed by a castout machine 310, snoop machine 311 or RC machine 312, (2) the directory information, and (3) availability of an RC machine 312 or snoop machine 311 to process the memory access request. If dispatch pipeline 306 makes a dispatch determination that the memory access request is to be dispatched, the memory access request is dispatched from dispatch pipeline 306 to an RC machine 312 or a snoop machine 311. If the memory access request fails dispatch, the failure is signaled to the requestor (e.g., local or remote processor core 200) by a retry response. The requestor may subsequently retry the failed memory access request, if necessary.

While an RC machine 312 is processing a local memory access request, the RC machine 312 has a busy status and is not available to service another request. While an RC machine 312 has a busy status, the RC machine 312 may perform a directory write to update the relevant entry of L2 directory 308, if necessary. In addition, the RC machine 312 may perform a cache write to update the relevant cache line of cache array 302. Directory writes and cache writes may be scheduled by arbiter 305 during any interval in which dispatch pipeline 306 is not already processing other requests according to the fixed scheduling of directory reads and cache reads. When all operations for the given request have been completed, the RC machine 312 returns to an unbusy state.

Associated with RC machines 312 is data handling circuitry, different portions of which are employed during the servicing of various types of local memory access requests. For example, for a local load request that hits in L2 directory 308, an uncorrected copy of the target memory block is forwarded from cache array 302 to the affiliated processor core 200 via data path 340 and load data multiplexer M3 and additionally forwarded to ECC logic 344 via data path 342. In the case of an ECC error in the target memory block obtained by the local load request, corrected data is forwarded to RCDAT buffer 322 via data path 346 and store data multiplexer M4 and then from RCDAT 322 to affiliated processor core 200 via data path 360 and load data multiplexer M3. For a local store request, store data is received within RCDAT buffer 322 from STQ 304 via data path 324 and store data multiplexer M4, the store is merged with the memory block read into RCDAT buffer 322 from cache array 302 via ECC logic 344 and store data multiplexer M4, and the merged store data is then written from RCDAT buffer 322 into cache array 302 via data path 362. In response to a local load miss or local store miss, the target memory block acquired through issuing a memory access operation on local interconnect 114 is loaded into cache array 302 via reload bus 313, store data multiplexer M4, RCDAT buffer 322 (with store merge for a store miss) and data path 362.

Figure 4:
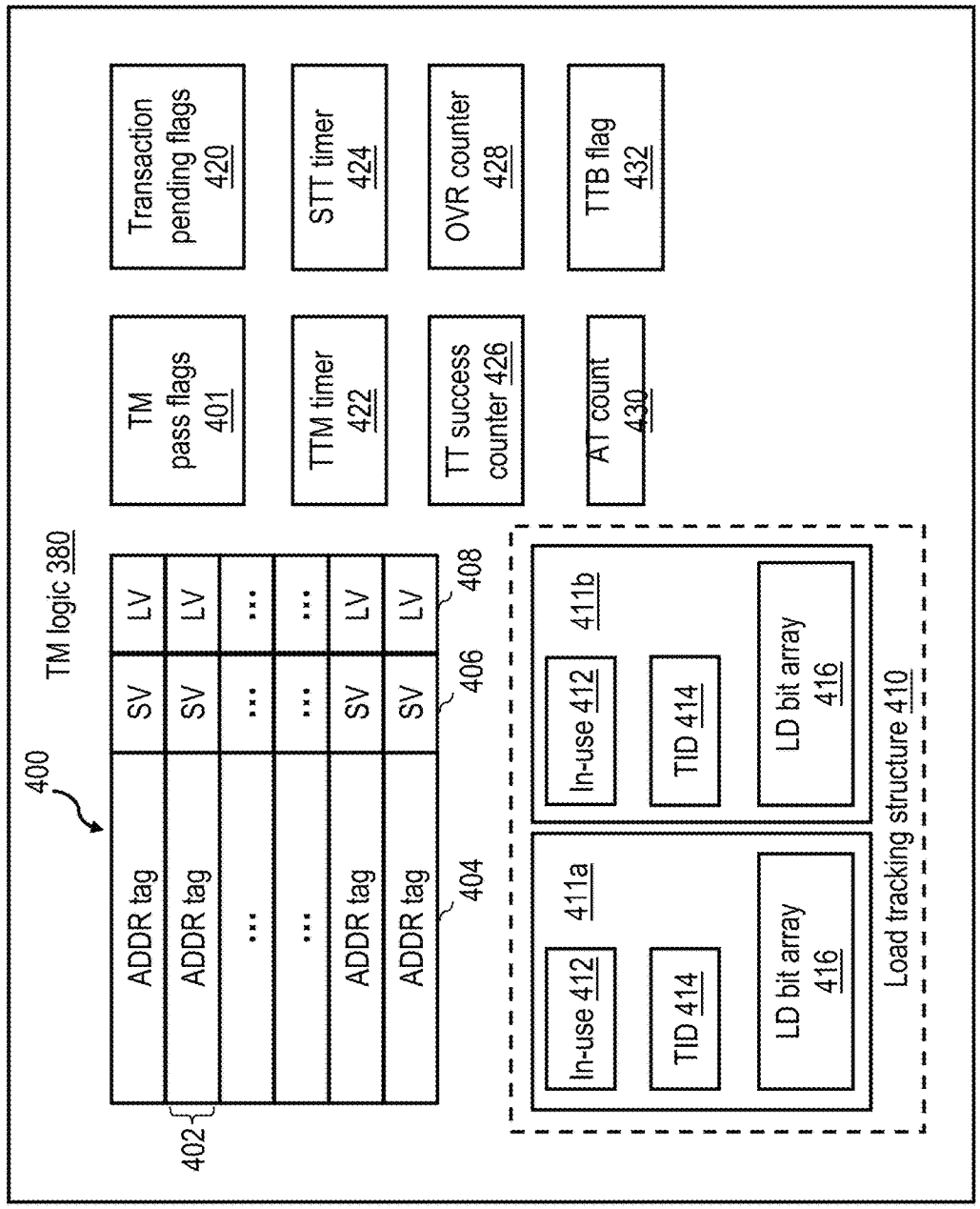
FIG. 4 is a more detailed block diagram of exemplary embodiment of the transactional memory (TM) logic in the L2 cache of FIG. 3.

Referring now to FIG. 4, there is illustrated a more detailed view of TM logic 380 of L2 cache 230 in accordance with one embodiment. As depicted, TM logic 380 includes a set of TM pass flags 401, each of which indicates whether a memory transaction, if any, under execution by a respective associated hardware thread of the processor core 200 is currently passing or failing. Thus, for example, if processor core 200 supports up to eight concurrently executing hardware threads, TM pass flags 401 will include eight flags.

TM logic 380 further includes a shared TM directory 400 that records the transaction footprint(s) of the memory transaction(s), if any, under execution by the hardware threads of the associated processor core 200. TM directory 400 contains a number of entries 402, which in the depicted embodiment, each include at least three fields: address tag field 404, store valid (SV) field 406, and load valid (LV) field 408. Address tag field 404 indicates the real memory address of a cache line that is in the transaction footprint of an active memory transaction. SV field 406 and LV field 408 respectively indicate whether the cache line is part of the store footprint or load footprint of the memory transaction. In at least one embodiment, SV field 406 and LV field 408 are mutually exclusive, meaning that, for a given entry 402, one or neither of SV field 406 and LV field 408 may be set concurrently but not both. When both of fields 406 and 408 are reset, the entry 402 is invalid and no cache line is then being tracked by that entry 402. LV field 408 preferably includes one bit per hardware thread, with multiple LV bits possibly being active at a time. Because only one thread at a time can have a given cache line in the store footprint of its memory transaction, SV field 406 can be implemented with a single bit and an associated thread ID indicator.

When a transactional load of a memory transaction is presented to TM logic 380 and there is no entry in TM directory 400 for the target cache line of the transactional load, a new entry 402 is allocated (if available), the address tag field 404 of the new entry is updated with the address tag of the target cache line, and the LV field 408 is set. If, on the other hand, an existing entry 402 is already tracking the target cache line (and therefore either LV field 408 or SV field 406 is already set), no update to the existing entry 402 is made because the target cache line of the transactional load is already being tracked.

As with a transactional load, if a transactional store is presented to TM logic 380 and there is no entry in TM directory 400 for the target cache line of the transactional store, a new entry 402 is allocated (if available), the address tag field 404 of the new entry is updated with the address tag of the target cache line, and the SV field 406 is set. If, on the other hand, an existing entry 402 is already tracking the target cache line and LV field 408 is set for that entry 402, then LV field 408 is reset, and SV field 406 is set to indicate that this cache line is now part of the store footprint for the memory transaction. If SV field 406 is already set for the existing entry 402, no update to entry 402 is performed. In response to an active memory transaction committing or failing, TM logic 380 clears the associated entries 402 in TM directory 400 and resets the TM pass flag 410 for the relevant hardware thread.

It should be noted that, in practical implementations, the depth of TM directory 400 is necessarily limited by design constraints, for example, to 32, 64, or 128 entries 402. Because these entries 402 can be utilized to concurrently track the transaction footprints of multiple memory transactions executing on different hardware threads, a new entry 402 will not always be available for allocation to track a transactional load or transactional store, when received from processor core 200. Consequently, if an entry 402 needed to track a cache line in the transaction footprint of a given memory transaction is unavailable for allocation, TM logic 380 detects an overflow condition for the given memory transaction and fails the memory transaction.

In order to reduce the number of memory transactions that fail due to such tracking structure overflow conditions, TM logic 380 may optionally further include a supplemental transaction footprint tracking structure, such as load tracking structure 410. In this example, load tracking structure 410 includes one or more instances 411*a*, 411*b* of facilities for tracking only the load footprint(s) of only a subset (e.g., two) of the hardware threads of the associated processor core 200. Each instance 411 of these load tracking facilities includes an in-use flag 412 and thread ID (TID) register 414, which respectively indicate whether or not the instance has been allocated for use to track the load footprint of a memory transaction and, if so, the TID of the thread executing that memory transaction. Each instance 411 of the load tracking facilities additionally includes a load (LD) bit array 416, which can conveniently be sized to include one bit for each cache line in the local cache array 302. Thus, TM logic 380 can track the entire load footprint of a memory transaction of a thread allocated an instance of the load tracking facilities of load tracking structure 410 by setting a bit in LD bit array 416 for each cache line in cache array 302 to which a transactional load is performed by the thread. Because these transactional loads are tracked in load tracking structure 410, if present, these transactional loads are not also tracked in TM directory 400.

In a preferred embodiment, TM logic 380 assigns instances 411 of the load tracking facilities of load tracking structure 410 to memory transactions, as available, on a first-come, first-served basis. As will be appreciated, memory transaction that are allocated an instance 411 of the load tracking facilities of load tracking structure 410 (and particularly, large memory transactions including many transactional loads) are less likely to fail due to overflow than other memory transactions that are not allocated facilities in load tracking structure 410 and must therefore rely on the available capacity of TM directory 400 to track all of their transactional loads and stores.

The present application appreciates, however, that memory transactions can still fail due to overflow of the transaction footprint tracking structures, even in embodiments that supplement TM directory 400 with an additional tracking structure, such as optional load tracking structure 410. These overflow failures can occur due to the size of the memory transaction(s) and/or the number of threads concurrently executing memory transactions and thus competing for the limited resources of the available transaction footprint tracking structures. As a result, the failing memory transaction(s) may need to be repeated multiple times to succeed, and in the worst case, may never be able to succeed in the presence of contention for the available transaction footprint tracking structures.

TM logic 380 is preferably configured to further address the failure of memory transactions due to overflow of the available transaction footprint tracking structures by supporting multiple modes of operation between which TM logic 380 can dynamically transition to promote the successful completion of memory transactions. These multiple modes of operation include a normal mode of operation in which TM logic 380 allocates entries in TM directory 400 and instances 411 of the load tracking facilities of load tracking structure 410 (if present) to the memory transactions of up to the maximum number of concurrent hardware threads on a first-come, first-served basis as described above. TM logic 380 preferably further supports one or more throttled modes of operation in which TM logic 380 restricts the number of threads whose memory transactions may be allocated entries in TM directory 400 and instances 411 of the load tracking facilities of load tracking structure 410 (if present). In some embodiments, a single throttled mode of operation is implemented, and only a single hardware thread at a time is permitted to execute a memory transaction. In other embodiments, multiple throttled modes of operation are supported, with one or more of such throttled modes permitting multiple hardware threads (but less than the maximum number of simultaneous hardware threads supported by the associated processor core 200) to concurrently execute memory transactions. In the discussion that follows, it will hereafter be assumed that TM logic 380 supports only two modes—the normal mode and a throttled mode in which only one thread at a time can execute memory transactions. From this discussion, those skilled in the art will readily appreciate the modifications and extensions necessary for TM logic 380 to support additional throttled modes of operation.

To support dynamic transaction throttling, TM logic 380 preferably includes a number of additional counters, timers, registers, and/or flags to maintain state information. For example, in the embodiment given in FIG. 4, TM logic 380 includes a set of per-thread transaction pending flags 420, with each transaction pending flag indicating whether or not the associated hardware thread of processor core 200 is currently executing a memory transaction. In addition, TM logic 380 includes a throttled transaction mode (TTM) timer 422 that indicates a duration for which TM logic 380 has continuously operated in the throttled mode, as well as a subsequent throttled transaction (STT) timer 424 that indicates a duration for which TM logic 380 has waited in the throttled mode without a new memory transaction being initiated. In a preferred embodiment, timers 422-424 have three distinct states—off (i.e., not in use), running (i.e., in use), and expired (i.e., formerly running, but now not running due to reaching a threshold value). TM logic 380 further includes a throttled transaction (TT) success counter 426 indicating a number of memory transactions successfully completed in the throttled mode, an OVR counter 428 indicating a number of memory transactions failing due to an overflow of the transaction footprint tracking structure(s) of TM logic 380, an allowed transaction (AT) count register 430 specifying an allowed number of memory transactions that can be concurrently executed, and a throttled transaction block (TTB) flag 432 indicating whether TM logic 380 is transitioning from the normal mode to the throttled mode. The use of the additional state information provided by elements 420-432 in managing the operating mode of TM logic 380 will become clear with reference to the process described below with reference to FIGS. 6A-6D.

Figures 5, 6A:
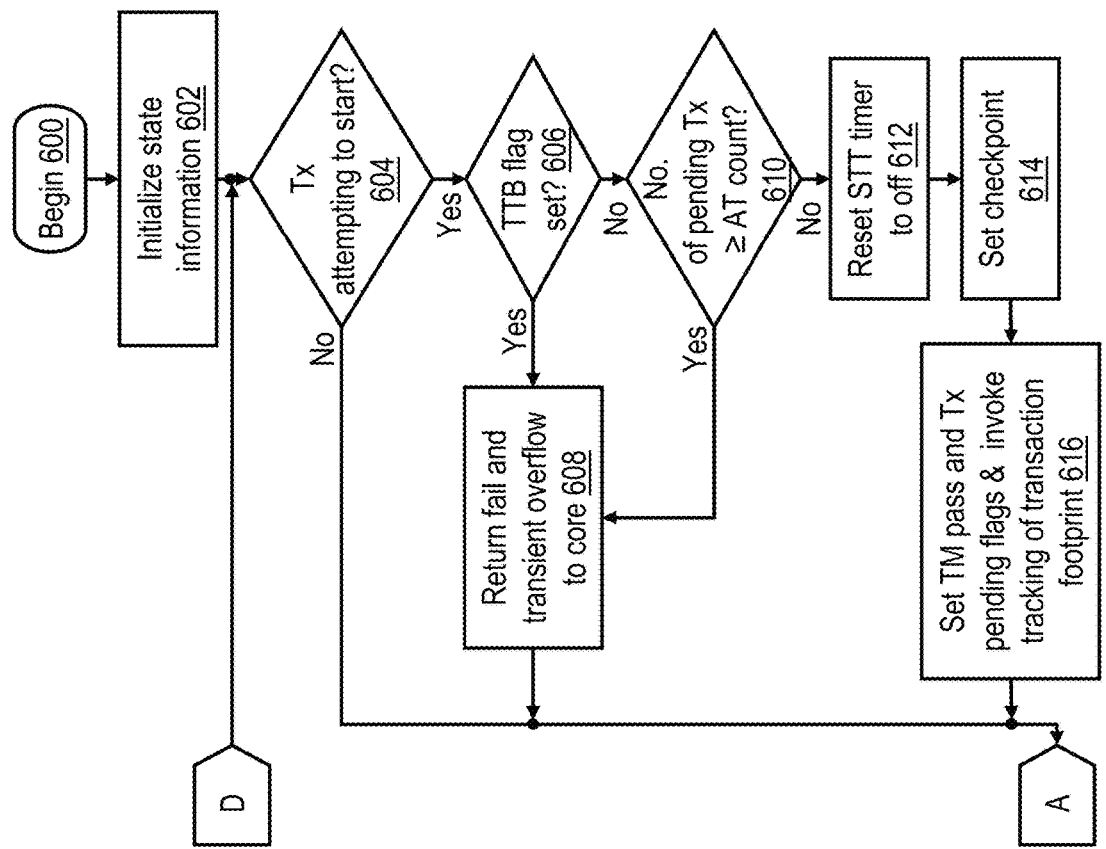
FIG. 5 is an illustrative example of a memory transaction in accordance with one embodiment.
FIG. 6A-6D is a high level logical flowchart of an exemplary process of managing memory transactions in accordance with one embodiment.

With reference now to FIG. 5, an illustrative example of a memory transaction is depicted. Those skilled in the art will recognize that the particular semantics and instructions utilized to implement memory transaction as described herein are but some of the numerous possible implementations and that the disclosed techniques of implementing transactional memory are not dependent on the specific instructions and instruction semantics employed.

Illustrative memory transaction 500 includes a tbegin instruction 502 that initiates transactional processing, a transaction body 506 including one or more memory access instructions that are to be performed atomically (and optionally one or more additional unillustrated instructions), and a tend instruction 508 that terminates transactional processing. Memory transaction 500 additionally includes a branch instruction 504 immediately following tbegin instruction 502. When memory transaction 500 first executes, the condition code register in processor core 200 upon which branch instruction 504 depends is initialized to a value that causes the program branch indicated by branch instruction 504 not to be taken and the flow of execution to continue to transaction body 506. In response to failure of memory transaction 500, as determined, for example, prior to or at the processing of the tend instruction 508, the condition code register is set to a different value, and branch instruction 504 causes execution to branch to a fail handler routine.

In response to execution of tbegin instruction 502, the executing processor core 200 takes a checkpoint and stores into checkpoint register 210 the architected register state of processor core 200 (which can be utilized to restore the state of processor core 200 in the event memory transaction 500 fails). In addition, the processor core 200 that is executing tbegin instruction 502 transmits a tbegin request corresponding to tbegin instruction 502 to the affiliated L2 cache 230 for processing by TM logic 380. The tbegin request, which specifies the TID of the executing hardware thread, invokes setting of the corresponding TM pass flag 410 and transaction pending flag 420 to indicate that the processor core 200 is currently executing a memory transaction 500 that has not yet failed. The tbegin request also causes TM logic 380 to begin tracking of the transactional memory accesses of transaction body 506 to ensure they complete in an atomic fashion or that memory transaction 500 fails in the presence of a conflict.

During the execution of transaction body 506, the executing processor core 200 issues load and store requests corresponding to the memory access instructions in transaction body 506 to L2 cache 230. The values stored to the distributed shared memory system by transaction body 506 (i.e., those in the store footprint of the memory transaction) are visible only to the thread of the processor core 200 executing the memory transaction. Threads running on other processor cores 200 will not "see" these values until and only if memory transaction 500 successfully commits.

For a memory transaction to successfully commit, the transactional load and store instructions in transaction body 506 must complete in an atomic fashion (i.e., there must be no conflicts for the cache lines in the memory transaction's load and store footprints) and the effects of the store instructions in transaction body 506 must propagate to all processing units 104 in data processing system 100 and invalidate any cached copies of those cache lines held in other processing units 104. If both of these conditions hold when tend instruction 508 is executed (and a corresponding tend request is transmitted to L2 cache 230), TM logic 380 indicates to processor core 200 via transaction resolution status bus 384 that memory transaction 500 passed and causes all stores performed in transaction body 506 to be committed to L2 cache 230, thus making them visible to all other threads in the system simultaneously.

In response to the transaction resolution status (or optionally TM killed indication 385) indicating that a conflict has occurred during execution of memory transaction 500, the executing processor core 200 and its associated cache hierarchy re-establish the architected register state from the checkpoint in checkpoint register 210 taken at the execution of tbegin instruction 502, invalidate the tentatively modified cache lines in the store footprint, update transaction state information in TM logic 380, set the condition code register of processor core 200 such that branch instruction 504 will be taken, and transfer control to branch instruction 504. In addition, processor core 200 can set a transaction failure cause register (not shown) in processor core 200 to indicate the cause of the memory transaction's failure. The fail handler routine invoked by branch instruction 504 may choose to re-attempt memory transaction 500 or fall back to more conventional locking mechanisms, optionally based on the content of the transaction failure cause register.

In one exemplary embodiment, a conflict policy of data processing system 100 defines a conflict with another processor core's memory access to occur for a given memory transaction in any one of several possible cases. In a first case, a conflict occurs if a non-transactional store from another processor core 200 hits a cache line within either the given memory transaction's load or store footprint. In a second case, a conflict occurs if a transactional store from another processor core 200 hits a cache line within the given memory transaction's load footprint. In a third case, a conflict occurs if a non-transactional load hits a cache line within the given memory transaction's store footprint. In a fourth case, the given memory transaction has a conflict if one of its transactional loads hits an address already extant in the store footprint of another processor core's memory transaction. In a fifth case, the given memory transaction has a conflict if one of its transactional stores hits an address already extant in the store footprint of another processor core's memory transaction. The above conflict policy biases in favor of transactional stores over transactional loads, while allowing transactional and non-transactional loads to freely intermingle. This exemplary conflict policy is but one of several possible embodiments.

Figure 6B:
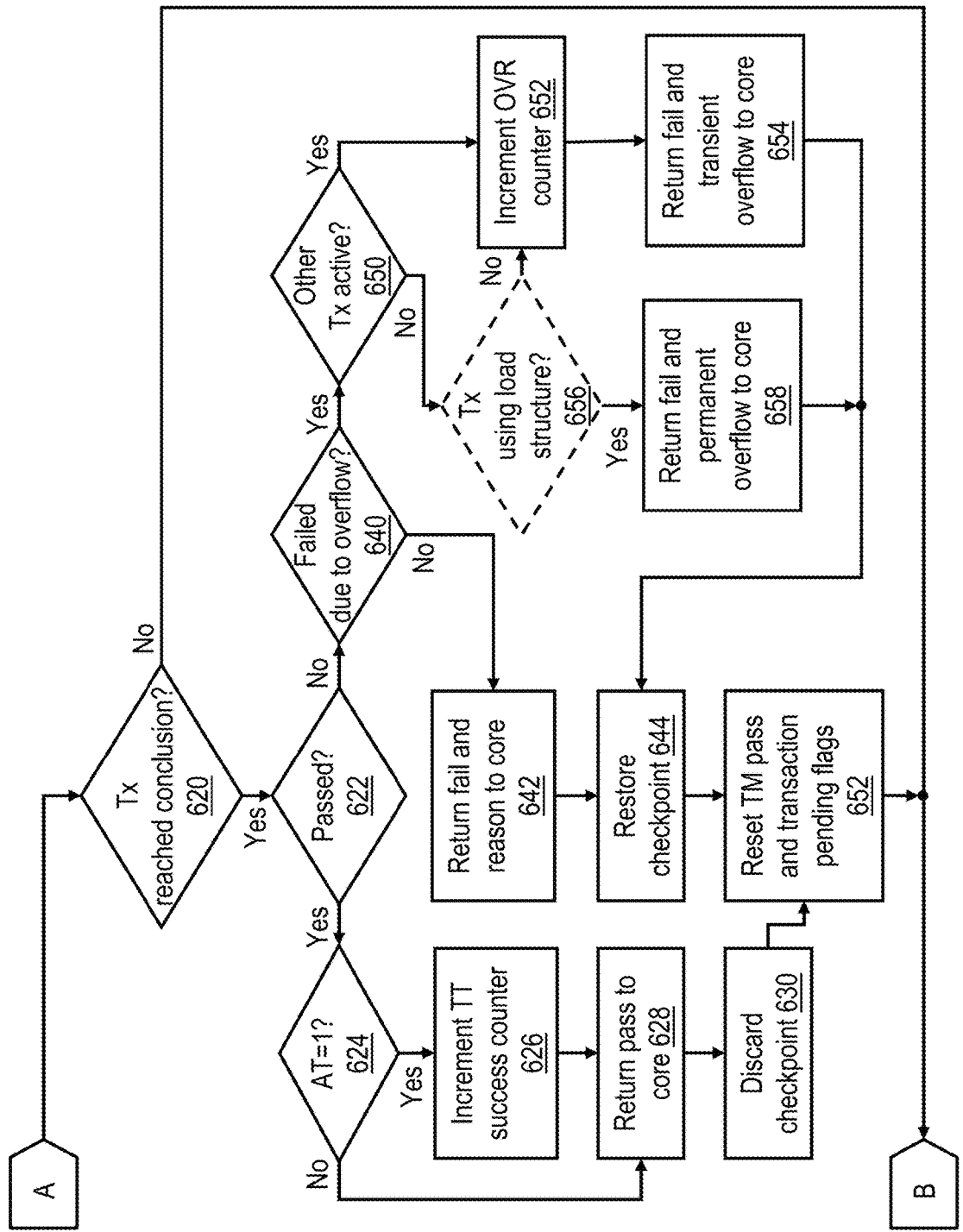
Figure 6C:
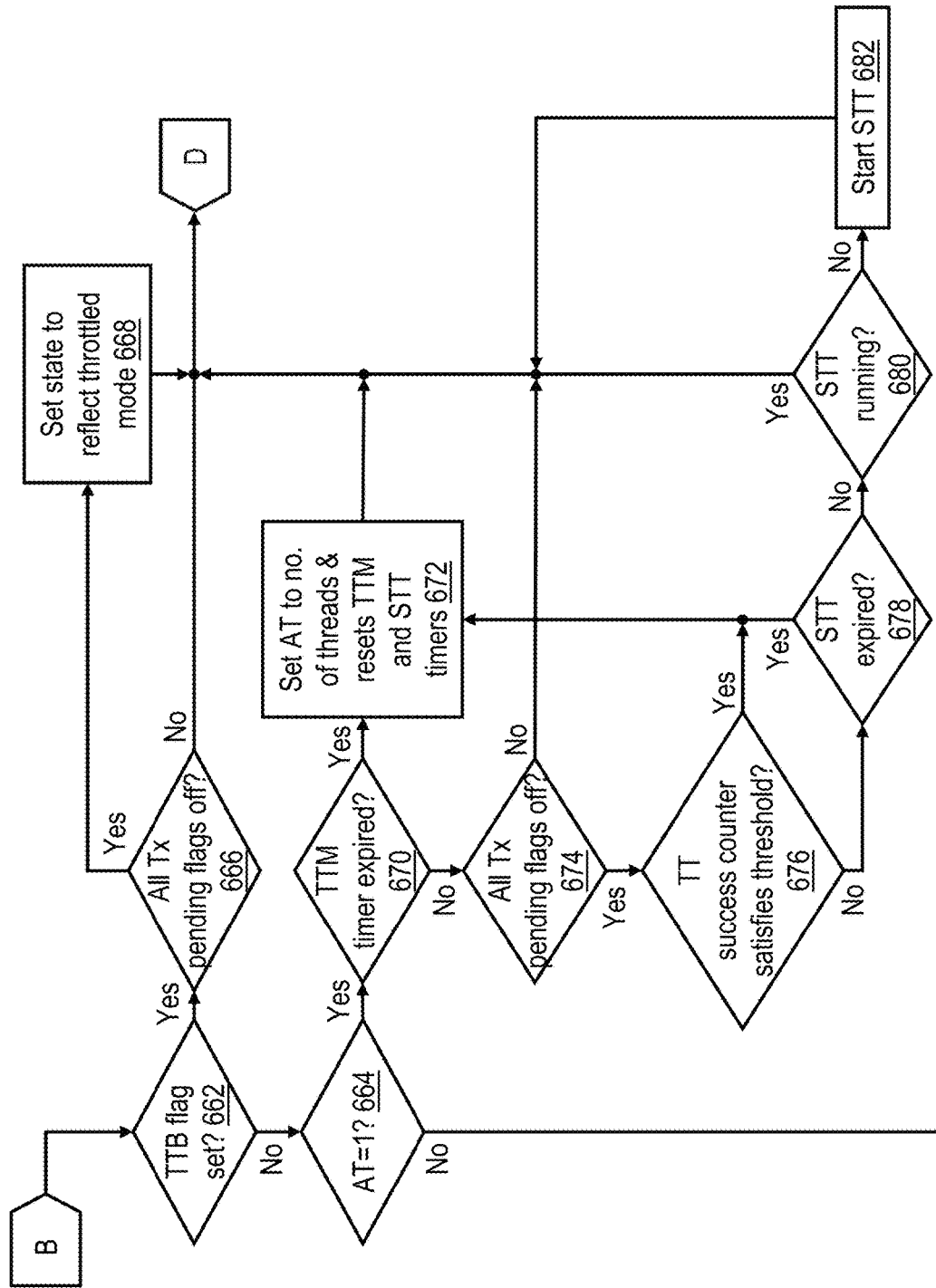
Figure 6D:
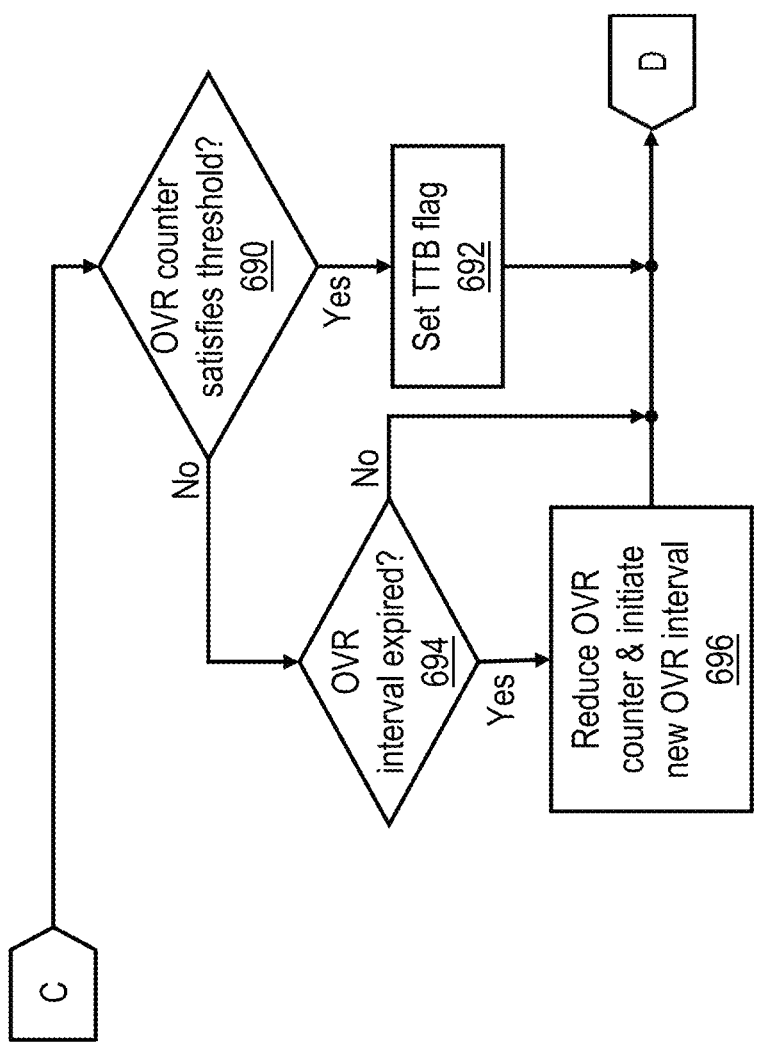

Referring now to FIGS. 6A-6D, there is illustrated a high level logical flowchart of an exemplary method of managing memory transactions in accordance with one embodiment. The illustrated process is continuously and iteratively performed by TM logic 380 as L2 cache 230 receives requests from the associated processor core 200 corresponding to the instructions forming a memory transaction. FIG. 6A illustrates how TM logic 380 handles the initiation of a memory transaction, FIG. 6B depicts how TM logic 380 handles the ending of a memory transaction, and FIGS. 6C-6D illustrates how TM logic 380 transitions between the normal and throttled modes of operation.

The process begins at block 600 of FIG. 6A and then proceeds to block 602, which illustrates TM logic 380 initializing the internal state information utilized for tracking memory transactions. In particular, TM logic 380 resets TM pass flags 401 and transaction pending flags 420, clears TTM timer 422 and STT timer 424, initializes TT success counter 426 and OVR counter 428 to count values of zero, sets AT count register 430 to the maximum number of hardware threads supported by processor core 200, and resets TTB flag 432 to 'false'.

Next, at block 604, TM logic 380 detects whether or not a memory transaction is attempting to start execution, for example, by detecting receipt by L2 cache 230 of a tbegin request from the associated processor core 200. If TM logic 380 does not detect that a memory transaction is attempting to start execution, the process passes through page connector A to FIG. 6B. If, however, TM logic 380 determines at block 604 that a memory transaction is attempting to start execution, TM logic 380 makes the determinations illustrated at blocks 606-608. Specifically, TM logic 380 determines at block 606 whether or not TTB flag 432 is set to 'true' to indicate that TM logic 380 is preparing to transition from the normal mode of operation to the throttled mode. At block 608, TM logic 380 determines whether or not the number of pending transactions is greater than or equal to the number of in-flight memory transactions currently allowed, as specified by AT count register 430. In response to an affirmative determination at either block 606 or block 610, TM logic 380 returns to processor core 200, via transaction resolution status bus 384, a fail indication indicating a transient overflow condition (block 608). In response to this fail indication, the fail handler routine preferably attempts to re-execute the memory transaction at least once prior to falling back to other conflict resolution techniques, such as a locking mechanism.

In response to TM logic 380 making negative determinations at blocks 606 and 610, TM logic 380 determines that the memory transaction attempting to start execution will be permitted to proceed. Accordingly, TM logic 380 resets STT timer 424 to the off state (block 612), and the processor core 200 stores a checkpoint in checkpoint register 210 (block 614). In addition, TM logic 380 sets the TM pass flag 401 and transaction pending flag 420 for the relevant hardware thread of the associated processor core 200 (i.e., the one executing the memory transaction) and invokes tracking of the transaction footprint of the memory transaction by TM logic 380 (block 616). As noted above, the transaction footprint of the memory transaction will be tracked in TM directory 400, and if present and available, an instance 411 of the load tracking facilities of load tracking structure 410. Thereafter, the process passes through page connector A to FIG. 6B.

With reference now to FIG. 6B, the process proceeds from page connector A to block 620, which illustrates TM logic 380 determining whether or not any memory transaction it is tracking has reached its conclusion, for example, based on receipt of a tend request from a thread of the associated processor core 200, among other reasons. If not, the process passes through page connector B to FIG. 6C. If, however, TM logic 380 determines at block 620 that a memory transaction has reached its conclusion, TM logic 380 determines at block 622 whether or not the memory transaction passed (i.e., reached its conclusion without a conflict or overflow or other reason for failure). If not, the process passes from block 622 to block 640, which is described below. If, however, TM logic 380 determines at block 622 that the memory transaction passed, TM logic 380 further determines at block 624 whether the memory transaction passed while TM logic 380 was operating in the throttled mode. In the depicted embodiment, TM logic 380 makes this determination by checking whether or not AT count register 430 specifies that the current number of allowed concurrent memory transaction is 1. If not, meaning that the memory transaction passed with TM logic 380 operating in the normal operating mode, the process passes to block 628, which is described below. If, however, TM logic 380 determines at block 624 that the memory transaction passed while TM logic 380 was in the throttled mode, TM logic 380 increments TT success counter 426 to reflect that an additional memory transaction has completed successfully in the throttled mode of operation. The process then proceeds to block 628.

At block 628, TM logic 380 returns a pass indication to the associated processor core 200 via transaction resolution status bus 384. In response to receipt of the pass indication, the processor core 200 discards the checkpoint in checkpoint register 210 (block 630). As shown at block 652, TM logic 380 also resets the TM pass flag 401 and transaction pending flag 420 corresponding to the hardware thread that executed the memory transaction to reflect that the hardware thread no longer has a pending memory transaction. Thereafter, the process passes through page connector B to FIG. 6C.

Referring now to block 640, TM logic 380 determines whether or not the non-passing memory transaction that concluded failed due to an overflow condition. If so, the process proceeds from block 640 to block 650, which is described below. If, however, TM logic 380 determines that the memory transaction did not fail due to an overflow condition (e.g., it failed due to a conflict), TM logic 380 returns a fail indication and a failure reason to the associated processor core 200 via transaction resolution status bus 384 (block 642). As indicated at block 644, in response to receipt of the fail indication, the processor core 200 sets the condition code register of processor core 200 to reflect the failure of the memory transaction and restores its architected register state from the checkpoint in checkpoint register 210 (block 644). Thereafter, the process passes to block 652, which has been described.

Referring now to block 650, in response to TM logic 380 determining that the memory transaction failed due to an overflow condition, TM logic 380 preferably handles the failure in accordance with the cause of the overflow condition. For example, the overflow can be caused by (1) the number of concurrent memory transactions specified by AT count register 430 being exceeded, (2) contention between threads for the limited transaction footprint tracking resources of TM directory 400 (and, if present, load tracking structure 410), and/or (3) the size of the transaction footprint simply being greater than that of the limited transaction tracking resources of TM directory 400 (and, if present, load tracking structure 410). To appropriately handle these different overflow conditions, TM logic 380 determines at block 650 whether any other memory transaction (besides the failed memory transaction) is active, for example, by reference to transaction pending flags 420. If so, TM logic 380 presumes in the depicted embodiment that the failure was due to contention for the transaction footprint tracking resources of TM logic 380 or the number of threads permitted to concurrently execute memory transactions being exceeded. TM logic 380 accordingly increments OVR counter 428 at block 652 to reflect how many memory transactions have failed due to overflow in a current monitoring interval. In addition, TM logic 380 returns a fail indication and a failure reason of transient overflow to the associated processor core 200 via transaction resolution status bus 384 (block 654). In response to this failure reason, the transaction fail handler preferably attempts to re-execute the memory transaction at least once prior to falling back to other failure handling techniques (conventional locking) under the assumption that the transient cause of failure will be resolved prior to the subsequent execution of the memory transaction. Following block 654, the process of FIG. 6B passes to block 644, which has been described.

Returning to block 650, in response to a determination that no other memory transaction besides the failed memory transaction is active, TM logic 380 may, in embodiments including load tracking structure 410, further determine at block 652 whether or not the failed memory transaction was allocated an instance of the load tracking facilities in load tracking structure 410. If TM logic 380 determines at block 656 that the failed memory transaction was not allocated an instance of the load tracking facilities in load tracking structure 410, this condition indicates that contention for transaction footprint tracking resources with one or more other memory transaction(s) that have already completed (and are thus no longer pending) may have caused the overflow condition for the failed memory transaction. Consequently, the failed memory transaction has a good probability of passing if it is executed again while allocated an instance 411 of the load tracking facilities in load tracking structure 410. Accordingly, in response to a negative determination at block 656, the process of FIG. 6B passes to block 652 and following blocks, which have been described.

In response to a negative determination at block 656 or if block 656 is omitted, TM logic 380 returns a fail indication and a failure reason of permanent overflow to the associated processor core 200 via transaction resolution status bus 384 (block 658). In response to this failure reason, the transaction fail handler preferably does not cause the failed memory transaction to be re-executed, but instead resorts to an alternative fail handling technique (e.g., the use of conventional locking) given that the overflow condition was caused by due to a mismatch between the size of the transaction footprint and the transaction footprint tracking resources of TM logic 380 and thus cannot be resolved upon a subsequent execution of the memory transaction. Following block 658, the process of FIG. 6B passes to block 644, which has been described.

Referring now to FIGS. 6C-6D, the process by which TM logic 380 determines whether to change operational modes and transitions between operational modes is depicted. The process begins at page connector B and then proceeds to block 662, which illustrates TM logic 380 determining whether or not TTB flag 432 is set to indicate that TM logic 380 is changing its mode of operation from the normal mode to the throttled mode. (TTB flag 432 is set as discussed below with reference to block 692 of FIG. 6D.) If so, the process passes to block 666 of FIG. 6C, which is described below; if not, TM logic 380 additionally determines at block 664 whether or not it is already operating in the throttled mode, for example, by determining if AT count register 430 indicates that the current maximum number of concurrently executing memory transaction is 1. If so, the process passes to block 670 and following blocks, which are described below; if not, the process proceeds through page connector C to FIG. 6D.

Referring now to block 666, TM logic 380 determines whether all transaction pending flags 420 are off, indicating that no memory transactions are currently under execution by the associated processor core 200. If not, the process passes through page connector D to block 604 and following blocks of FIG. 6A, which have been described. If, however, TM logic 380 determines at block 666 that at least one memory transaction is pending, TM logic 380 changes its operating state from the normal mode to the throttled mode. As indicated at block 668, in the embodiment of FIG. 4 this change in operating mode includes setting the value of AT count register 430 to 1 (indicating that at most one memory transaction can be executed at a time), starting TTM timer 422 to track how long TM logic 380 operates in the throttled mode, initializing TT success counter 426 to 0 (indicating that no memory transactions have yet completed successfully in the current throttled mode), initializing OVR counter 428 to 0 (indicating no memory transactions have yet failed due to overflow in the throttled mode), and setting TTB flag 432 to 0. Thereafter, the process returns to block 604 of FIG. 6A through page connector D.

Referring now to block 670, while operating in the throttled mode, TM logic 380 determines whether TTM timer 420 has expired (i.e., has timed a maximum duration for operating in the throttled mode). If so, TM logic 380 returns to the normal mode of operation, for example, by setting AT count register 430 to the number of concurrent hardware threads supported by the associated processor core 200 and resetting TTM timer 420 and STT timer 424 (block 672). Thereafter, the process returns to block 604 of FIG. 6A through page connector D.

In response to a negative determination at block 670, TM logic 380 determines at block 674 whether or not all transaction pending flags 420 are off, indicating that no memory transactions are currently being executed by the associated processor core 200. If not, TM logic 380 does not make any change in its current throttled operating mode, and the process returns to block 604 of FIG. 6A through page connector D. If, however, TM logic 380 determines at block 674 that no memory transactions are pending, TM logic 380 further determines at blocks 676-678 whether it should change its operational mode based on successful completion of a threshold number of memory transactions in the throttled mode as indicated by TT success counter 426 (block 676) or expiration of STT timer 424 without having received a new memory transaction from the associated processor core 200 (block 678). In response to an affirmative determination at either block 676 or block 678, TM logic 380 changes its operational mode to the normal operating mode at block 672, which has been described. In response to negative determinations at block 676 and 678, TM logic 380 remains in the throttled mode. TM logic 380 accordingly starts STT timer 424 if it is not already in the running state (blocks 680-682), and the process returns to block 604 of FIG. 6A through page connector D.

With reference now to FIG. 6D, the process begins at page connector C and then proceeds to block 690, which illustrates TM logic 380 determining whether or not the number of memory transactions failing due to an overflow condition as reported by OVR counter 428 satisfies a threshold value. If so, TM logic 380 initiates a transition from the normal operating mode to the throttled operating mode by setting TTB flag 432 (block 692). The process then returns to block 604 of FIG. 6A through page connector D. If TM logic 380 determines at block 690 that the number of memory transactions failing due to an overflow condition as reported by OVR counter 428 does not satisfy the threshold, TM logic 380 determines whether or not a monitoring interval associated with OVR counter 428 has expired and, if so, reduces OVR counter 428 and initiates a new OVR monitoring interval (blocks 694-696). In some embodiments, TM logic 380 may reduce the count value in OVR counter 428, for example, by subtracting a fixed number from the count value (thresholded at 0) or dividing the count value (e.g., by 2). Following either block 694 or 696, the process returns to block 604 of FIG. 6A through page connector D.

Figure 7:
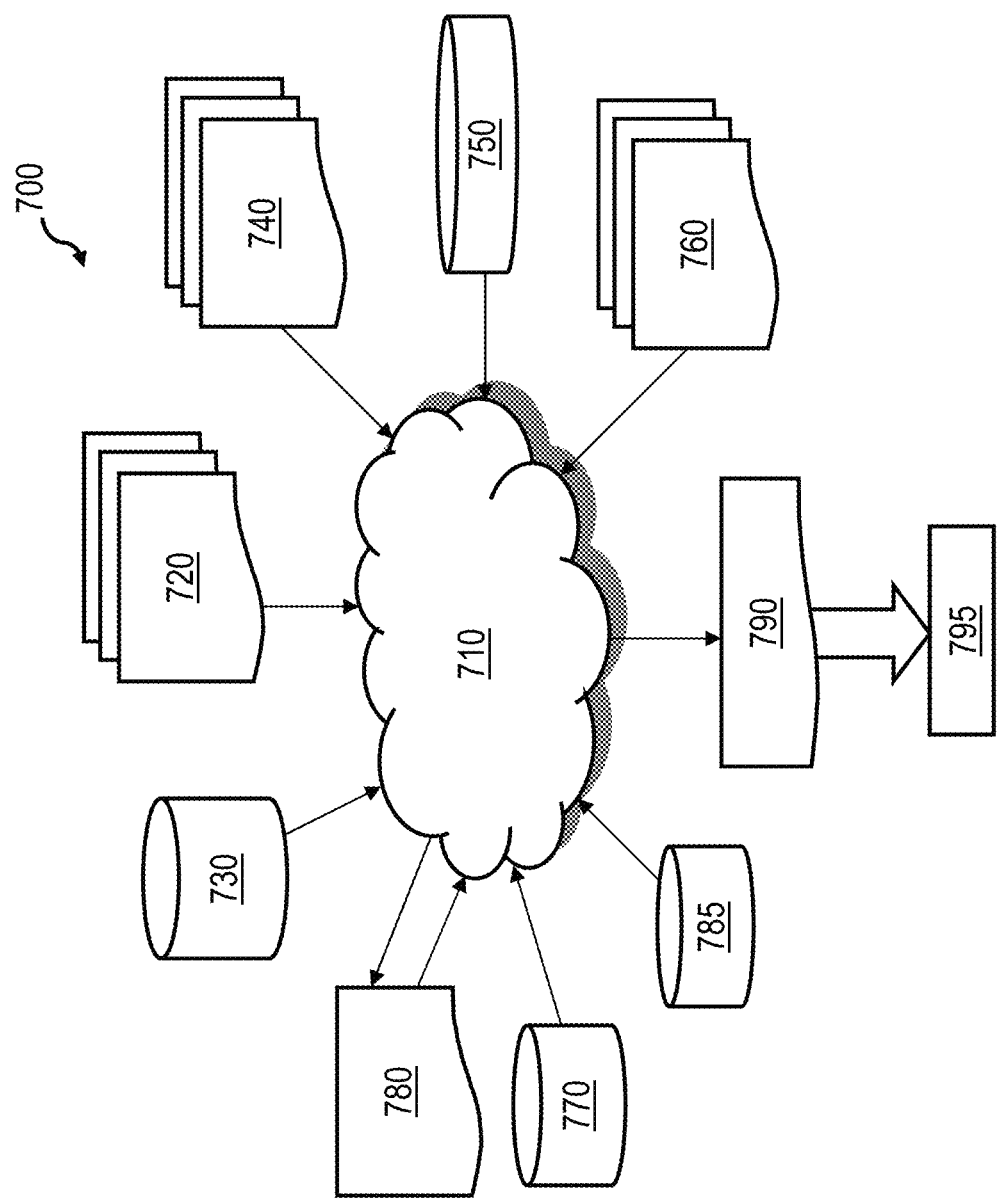
FIG. 7 is a data flow diagram illustrating a design process.

With reference now to FIG. 7, there is depicted a block diagram of an exemplary design flow 700 used for example, in semiconductor IC logic design, simulation, test, layout, and manufacture. Design flow 700 includes processes, machines and/or mechanisms for processing design structures or devices to generate logically or otherwise functionally equivalent representations of the design structures and/or devices described above and shown herein. The design structures processed and/or generated by design flow 700 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 700 may vary depending on the type of representation being designed. For example, a design flow 700 for building an application specific IC (ASIC) may differ from a design flow 700 for designing a standard component or from a design flow 700 for instantiating the design into a programmable array, for example a programmable gate array (PGA) or a field programmable gate array (FPGA) offered by Altera® Inc. or Xilinx® Inc.

FIG. 7 illustrates multiple such design structures including an input design structure 1020 that is preferably processed by a design process 710. Design structure 720 may be a logical simulation design structure generated and processed by design process 710 to produce a logically equivalent functional representation of a hardware device. Design structure 720 may also or alternatively comprise data and/or program instructions that when processed by design process 710, generate a functional representation of the physical structure of a hardware device. Whether representing functional and/or structural design features, design structure 720 may be generated using electronic computer-aided design (ECAD) such as implemented by a core developer/designer. When encoded on a machine-readable data transmission, gate array, or storage medium, design structure 720 may be accessed and processed by one or more hardware and/or software modules within design process 710 to simulate or otherwise functionally represent an electronic component, circuit, electronic or logic module, apparatus, device, or system such as those shown herein. As such, design structure 720 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 710 preferably employs and incorporates hardware and/or software modules for synthesizing, translating, or otherwise processing a design/simulation functional equivalent of the components, circuits, devices, or logic structures shown herein to generate a netlist 780 which may contain design structures such as design structure 720. Netlist 780 may comprise, for example, compiled or otherwise processed data structures representing a list of wires, discrete components, logic gates, control circuits, I/O devices, models, etc. that describes the connections to other elements and circuits in an integrated circuit design. Netlist 780 may be synthesized using an iterative process in which netlist 780 is resynthesized one or more times depending on design specifications and parameters for the device. As with other design structure types described herein, netlist 780 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 710 may include hardware and software modules for processing a variety of input data structure types including netlist 780. Such data structure types may reside, for example, within library elements 730 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 740, characterization data 750, verification data 760, design rules 770, and test data files 785 which may include input test patterns, output test results, and other testing information. Design process 710 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 710 without deviating from the scope and spirit of the invention. Design process 710 may also include modules for performing standard circuit design processes such as timing analysis, verification, design rule checking, place and route operations, etc.

Design process 710 employs and incorporates logic and physical design tools such as HDL compilers and simulation model build tools to process design structure 720 together with some or all of the depicted supporting data structures along with any additional mechanical design or data (if applicable), to generate a second design structure 790. Design structure 790 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 720, design structure 790 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 790 may comprise a compiled, executable HDL simulation model that functionally simulates the devices shown herein.

Design structure 790 may also employ a data format used for the exchange of layout data of integrated circuits and/or symbolic data format (e.g., information stored in a GDSII (GDS2), GL1, OASIS, map files, or any other suitable format for storing such design data structures). Design structure 790 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 790 may then proceed to a stage 795 where, for example, design structure 790: proceeds to tape-out, is released to manufacturing, is released to a mask house, is sent to another design house, is sent back to the customer, etc.

As has been described, in at least one embodiment, a processor core of a processing unit executes instructions in a plurality of simultaneous hardware threads, where multiple of the plurality of hardware threads concurrently execute memory transactions. A transactional memory circuit in the processing unit tracks transaction footprints of the memory transactions of the multiple hardware thread. In response to detecting failure of a given memory transaction of one of the plurality of multiple threads due to an overflow condition, the transactional memory circuit transitions to a throttled operating mode and reduces a number of hardware threads permitted to concurrently execute memory transactions.

While various embodiments have been particularly shown and described, it will be understood by those skilled in the art that various changes in form and detail may be made therein without departing from the spirit and scope of the appended claims and these alternate implementations all fall within the scope of the appended claims.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although a particular embodiment of a memory hierarchy has been described in which L1 and L2 caches are incorporated within a processing unit, those skilled in the art will appreciate that a greater or lesser number of levels of cache hierarchy may be employed. Further, these levels of cache hierarchy may include in-line or lookaside caches and may include one or more levels of off-chip cache. Further, the level of cache hierarchy at which coherency is determined may differ from that discussed with reference to the described embodiments.

Further, although aspects have been described with respect to a computer system executing program code that directs the functions of the present invention, it should be understood that present invention may alternatively be implemented as a program product including a computer-readable storage device storing program code that can be processed by a data processing system. The computer-readable storage device can include volatile or non-volatile memory, an optical or magnetic disk, or the like. However, as employed herein, a "storage device" is specifically defined to include only statutory articles of manufacture and to exclude signal media per se, transitory propagating signals per se, and energy per se.

The program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of data processing in a processing unit including a processor core and a cache hierarchy, the method comprising:

the processor core executing instructions in a plurality of simultaneous hardware threads, wherein executing the instructions includes concurrently executing memory transactions in multiple of the plurality of hardware threads;

a transactional memory circuit in the processing unit tracking transaction footprints of the memory transactions of the multiple hardware threads; and based on detecting failure of a given memory transaction of one of the multiple hardware threads due to an overflow condition, the transactional memory circuit transitioning to a throttled operating mode and reducing a number of hardware threads permitted to concurrently execute memory transactions while the processor core continues execution of all of the plurality of simultaneous hardware threads.

2. The method of claim 1, wherein:

the transactional memory circuit includes a transaction footprint tracking structure; and the method further comprises the transactional memory circuit detecting an overflow condition based on a lack of availability of an entry in the transactional footprint tracking structure to track a transactional memory access of the given memory transaction.

3. The method of claim 2, wherein:

the transaction footprint tracking structure includes multiple instances of a memory transaction tracking facility and the transaction footprint tracking structure includes fewer instances of the memory transaction tracking facility than the multiple hardware threads are in number; and the reducing includes reducing the number of hardware threads permitted to concurrently execute memory transactions sufficiently to guarantee availability of an instance of the memory transaction tracking facility for allocation to the given memory transaction if re-executed.

4. The method of claim 1, and further comprising:

based on detecting at least one condition in a set including expiration of a timer and a threshold number of memory transactions completing successfully in the throttled operating mode, the transactional memory circuit increasing a number of hardware threads permitted to concurrently execute memory transactions.

5. The method of claim 1, wherein in the throttled operating mode, the transactional memory circuit reduces the number of hardware threads permitted to concurrently execute memory transactions to a single hardware thread.

6. The method of claim 1, and further comprising:

based on detecting failure of the given memory transaction, the transactional memory circuit returning to the processor core a fail indication and an indication that the given memory transaction failed due to an overflow condition.

7. A processing unit, comprising:

a processor core configured to execute instructions in a plurality of simultaneous hardware threads, wherein multiple of the plurality of hardware threads concurrently execute memory transactions;

a cache hierarchy coupled to the processor core; and a transactional memory circuit configured to track transaction footprints of the memory transactions of the multiple hardware threads and, based on detecting failure of a given memory transaction of one of the multiple hardware threads due to an overflow condition, to transition to a throttled operating mode that reduces a number of hardware threads permitted to concurrently execute memory transactions while the processor core continues execution of all of the plurality of simultaneous hardware threads.

8. The processing unit of claim 7, wherein:

the transactional memory circuit includes a transaction footprint tracking structure; and the transactional memory circuit is configured to detect an overflow condition based on a lack of availability of an entry in the transactional footprint tracking structure to track a transactional memory access of the given memory transaction.

9. The processing unit of claim 8, wherein:

the transaction footprint tracking structure includes multiple instances of a memory transaction tracking facility and the transaction footprint tracking structure includes fewer instances of the memory transaction tracking facility than the multiple hardware threads are in number; and the transactional memory circuit reduces the number of hardware threads permitted to concurrently execute memory transactions sufficiently to guarantee availability of an instance of the memory transaction tracking facility for allocation to the given memory transaction if re-executed.

10. The processing unit of claim 7, wherein the memory transaction circuit is further configured to, based on detecting at least one condition in a set including expiration of a timer and a threshold number of memory transactions completing successfully in the throttled operating mode, increase a number of hardware threads permitted to concurrently execute memory transactions.

11. The processing unit of claim 7, wherein in the throttled operating mode, the transactional memory circuit reduces the number of hardware threads permitted to concurrently execute memory transactions to a single hardware thread.

12. The processing unit of claim 7, wherein the transactional memory circuit is further configured to, based on detecting failure of the given memory transaction, return to the processor core a fail indication and an indication that the given memory transaction failed due to an overflow condition.

13. A data processing system, comprising:

a plurality of processing units in accordance with claim 7; and an interconnect fabric coupling the plurality of processing units.

14. A design structure tangibly embodied in a machine-readable storage medium for designing, manufacturing, or testing an integrated circuit, the design structure comprising:

a processing unit, including:

a processor core configured to execute instructions in a plurality of simultaneous hardware threads, wherein multiple of the plurality of hardware threads concurrently execute memory transactions;

a cache hierarchy coupled to the processor core; and a transactional memory circuit configured to track transaction footprints of the memory transactions of the multiple hardware threads and, based on detecting failure of a given memory transaction of one of the multiple hardware threads due to an overflow condition, to transition to a throttled operating mode that reduces a number of hardware threads permitted to concurrently execute memory transactions while the processor core continues execution of all of the plurality of simultaneous hardware threads.

15. The design structure of claim 14, wherein:

the transactional memory circuit includes a transaction footprint tracking structure; and the transactional memory circuit is configured to detect an overflow condition based on a lack of availability of an entry in the transactional footprint tracking structure to track a transactional memory access of the given memory transaction.

16. The design structure of claim 15, wherein:

the transaction footprint tracking structure includes multiple instances of a memory transaction tracking facility and the transaction footprint tracking structure includes fewer instances of the memory transaction tracking facility than the multiple hardware threads are in number; and the transactional memory circuit reduces the number of hardware threads permitted to concurrently execute memory transactions sufficiently to guarantee availability of an instance of the memory transaction tracking facility for allocation to the given memory transaction if re-executed.

17. The design structure of claim 14, wherein the memory transaction circuit is further configured to, based on detecting at least one condition in a set including expiration of a timer and a threshold number of memory transactions completing successfully in the throttled operating mode, increase a number of hardware threads permitted to concurrently execute memory transactions.

18. The design structure of claim 14, wherein in the throttled operating mode, the transactional memory circuit reduces the number of hardware threads permitted to concurrently execute memory transactions to a single hardware thread.

19. The design structure of claim 14, wherein the transactional memory circuit is further configured to, based on detecting failure of the given memory transaction, return to the processor core a fail indication and an indication that the given memory transaction failed due to an overflow condition.

20. The design structure of claim 14, wherein the design structure comprises a hardware description language (HDL) design structure.

* * * * *